Nov. 7, 1950   A. G. ELLIS ET AL   2,529,331
CHUCK

Filed March 25, 1948   2 Sheets-Sheet 2

Inventors
Arthur G. Ellis
Maurice W. Abberley
By Jerome W. Paxton
Agent.

Patented Nov. 7, 1950

2,529,331

UNITED STATES PATENT OFFICE 2,529,331

CHUCK

Arthur Godfrey Ellis and Maurice Whiston Abberley, Stoke-on-Trent, England

Application March 25, 1948, Serial No. 16,914
In Great Britain November 14, 1947

12 Claims. (Cl. 279—3)

This invention relates to chucks for holding articles of clay, glass, plastics or other materials, in manufacture or finishing operations.

The object of the invention is to provide a chuck suitable for supporting pieces of extreme fragility, for instance unfired plastic clay cups and similar articles, whereby such pieces can be held and subjected to rotary movement while finishing operation such as turning or decoration are performed upon them.

Another object of the invention is to provide such a chuck that these fragile articles will not collapse or be damaged or distorted during the operations.

Another object of the invention is to ensure that the fragile articles will be correctly located and centered with reference to their axis of rotation.

Further objects will become apparent from the ensuing description and claims.

According to the present invention a chuck comprises an end stop adapted to fit up to the closed end of the clay pieces to be acted upon, a flexible sealing member adapted to make contact round the inside walls of the piece, means for exhausting the cavity between the sealing member and the end stop, and one or more members engaging with the inside walls of the piece at a suitable point or points for the purpose of correctly locating and centering the piece upon the chuck.

Figure 1:
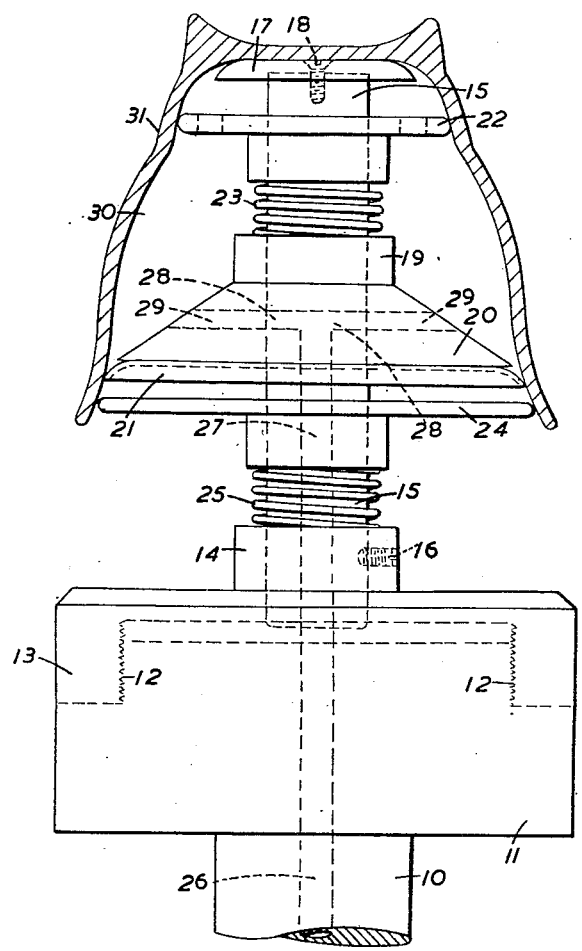
Figure 2:
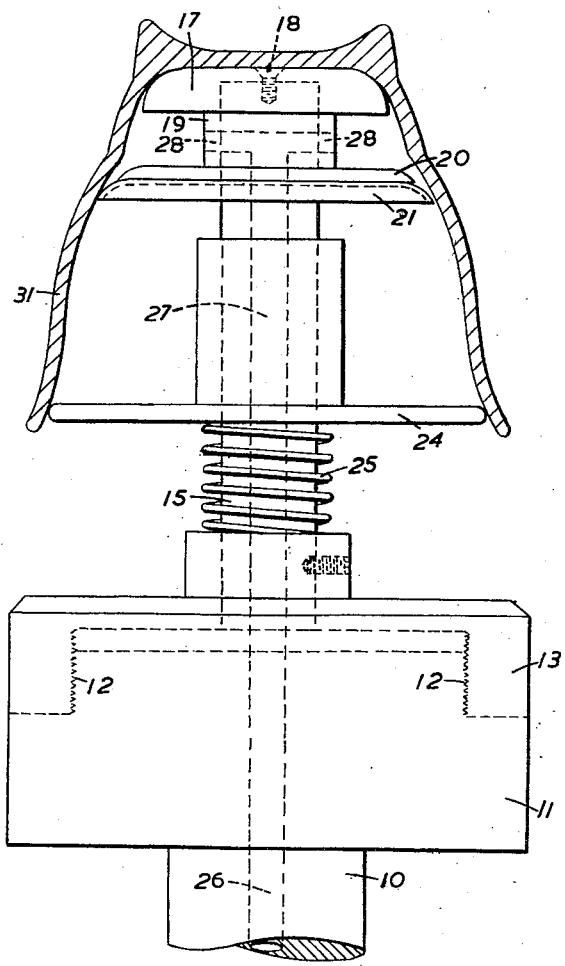

Referring to the drawings which form a part of this specification, Figures 1 and 2 are sectional elevations through two alternative forms of potters' chuck.

Referring to Figure 1 a spindle 10 has a boss 11 which is reduced in diameter and screw-threaded at 12. A collar 13 is screwed on to this reduced part of the boss 11, and the collar has a boss 14 by which it is fastened on to a chuck spindle 15 by means of one or more grub screws 16. A fixed locating disc 17 is secured to the end of the spindle 15 by a screw 18. A seal carrier comprising a boss 19 and conical part 20 is also secured on the spindle 15 in a fixed position by one or more grub screws or other means. The conical part 20 carries a flexible disc 21. Between the seal carrier and the end stop a holed locating disc 22 is mounted on the spindle 15 in a floating manner, free to move axially along the spindle under the control of a spring 23. Another similar locating disc 24 having a control spring 25 is mounted on the spindle 15 in a floating manner below the seal. A duct 26 passes along the spindle 10 and communicates with a duct 27 in the spindle 15, which in turn communicates with passages 28 in the spindle extending radially outwards and registering with passages 29 through the conical part 20 which emerge on the upper face of the cone. When a suction connection is applied to the other end of the duct 26, air will be exhausted from the cavity 30 when a clay piece 31 is fitted on to the chuck, the suction acting on the marginal part of the flexible disc 21 and causing it to make an air tight seal against the inside walls of the piece. The piece is thus held in position by the vacuum created in this way, and is correctly located and centered by the two discs 22, 24, which also engage with the inside walls of the piece at suitable points. The number and the position of these locating and centering discs will depend on the shape of the piece 31. In Figure 2 the upper disc 22 is omitted, but in this case, the stop 17 also acts as a centralizing member, fitting closely to the radius or shoulder of the workpiece to be acted upon, and only the lower disc 24 is provided. In some cases more than two discs might be preferable. The clay pieces 31 shown are cups or similar articles of hollow-ware. It is essential that the pieces shall have one closed end, or so nearly closed as to be capable of seating on the end disc 17 which forms an end stop. The invention is not limited to articles such as cups, bowls, beakers and the like, as it can also be used for teapots and similar vessels, or for deep-flanged lids or covers for teapots, jugs and so forth, and for any other shape or class of articles capable of being located and centered on the chucks. The invention is particularly intended for use in connection with machines such as potters' lathes, in which case the spindle 10 will be the driving spindle by which the chuck is rotated while turning or similar operations are carried out on the pieces. The chuck is of special value in connection with these machines as it enables articles to be quickly located and centered accurately, so that if desired automatically operated tool mechanisms can be used. It should be borne in mind that clay articles in the plastic state, in which turning operations are performed, are extremely fragile, and the invention is intended to reduce the risk of the article collapsing during the operation of the machine. In addition the chucks are suitable for use where the nature of the operations to be performed is other than turning, for example banding or other decorative treatments, and in some cases it will not be necessary for the chuck to be made to revolve; it will be simply a stationary support on which the pieces can be correctly centered and supported while work is performed upon them. The term "chuck" is used herein with this wider application in mind. It should also be made clear that although the drawings show the chucks in a vertical position, this is not essential, and such terms as "upper" and "lower" used herein are only for convenience in reference to the drawings; in some cases the chuck axis will be vertical but in others it will be horizontal.

Having now described our invention, what we claim as new and desire to secure by Letters Patent is:

1. A chuck comprising an end stop adapted to fit up to the closed end of the pieces to be acted upon, a flexible sealing member adapted to make contact round the inside walls of the piece, means for exhausting the cavity between the sealing member and the end stop bounded by the walls of the piece being acted upon, and at least one member engaging with the inside walls of the piece at a suitable point or points for the purpose of correctly locating and centering the piece upon the chuck.

2. A chuck comprising an end locating disc forming a stop for the closed end of pieces to be acted upon, a carrier for a flexible disc adapted to make contact round the inside walls of the piece, a duct leading to a suction connection for exhausting the cavity between the flexible disc and the end locating disc bounded by the walls of the piece being acted upon, and at least one locating and centering member engaging with the inside walls of the piece in a floating manner under spring action.

3. A chuck comprising a spindle, a locating disc fixed on one end of the spindle, a carrier for a flexible disc fixed on the spindle, a duct leading along the spindle through which the cavity between the flexible disc and the locating disc bounded by the inside walls of the piece can be exhausted, and at least one spring loaded centering and locating disc slidably movable on the spindle to engage with the inside walls of the piece.

4. A chuck comprising a spindle, a locating disc on the end of the spindle, a seal carrier on said spindle spaced away from the locating disc, a flexible sealing member carried by the seal carrier, at least one locating and centering disc axially movable on the spindle under the control of at least one coil spring mounted round the spindle, the spindle having a duct therethrough which emerges on the inner face of the seal carrier, the parts being so arranged that when a hollow-ware piece is fitted on the chuck a sealed cavity is bounded by it which can be exhausted through the duct to hold the piece in position by suction.

5. A chuck as claimed in claim 1 mounted on the driving spindle of a potters' lathe.

6. A chuck for articles having one end substantially closed and the other end open comprising a location for the substantially closed end of the article, a flexible sealing member, said flexible sealing member being adapted to enter the open end of the article and to make contact with the walls, and means for exhausting the cavity thus formed inside the article.

7. A chuck for articles having one end substantially closed and the other end open comprising means for forming an air seal within the article and means for exhausting the closed cavity thereby obtained.

8. A chuck for articles having one end substantially closed and the other end open comprising means for resiliently engaging with the inside walls of the piece, means for locating the closed end of the piece, and means for exhausting the internal cavity thus formed.

9. A chuck for articles having one end substantially closed and the end open comprising means for locating and centering the article on the chuck, means for resiliently engaging with the inside of the article, thereby forming a closed cavity bounded by the article, and means for exhausting from the cavity.

10. A chuck for articles having one end substantially closed and the other end open comprising a fixed member adapted to engage with the closed end, and a flexible member insertable through the open end and capable of forming a seal against the inside of the article, and means for exhausting air from the internal cavity so formed.

11. A method of acting on clay-ware pieces having one end substantially closed and the other end open comprising placing the piece on a fixed support, forming an air-tight seal from the open end of the piece, thereby forming a cavity within the piece, exhausting the air from the cavity, and operating on the external surface of the piece while so positioned.

12. A method according to claim 11 in which the piece is subjected to rotary movement while being operated on.

ARTHUR GODFREY ELLIS.
MAURICE WHISTON ABBERLEY.

REFERENCES CITED

The following references are of record in the file of this patent:

UNITED STATES PATENTS

| Number | Name | Date |
|---|---|---|
| 1,294,103 | Hitchcock | Feb. 11, 1919 |
| 1,430,050 | Becher | Sept. 26, 1922 |
| 2,203,572 | Johnson | June 4, 1940 |
| 2,348,085 | Merolle | May 2, 1944 |